US007155029B2

(12) United States Patent
King et al.

(10) Patent No.: US 7,155,029 B2
(45) Date of Patent: Dec. 26, 2006

(54) METHOD AND APPARATUS OF DETECTING FIRE BY FLAME IMAGING

(75) Inventors: John D. King, Roseville, MN (US); Paul M. Junck, Bloomington, MN (US)

(73) Assignee: Detector Electronics Corporation, Minneapolis, MN (US)

( * ) Notice: Subject to any disclaimer, the term of this patent is extended or adjusted under 35 U.S.C. 154(b) by 755 days.

(21) Appl. No.: 10/143,386

(22) Filed: May 10, 2002

(65) Prior Publication Data

US 2003/0044042 A1 Mar. 6, 2003

Related U.S. Application Data

(60) Provisional application No. 60/290,417, filed on May 11, 2001.

(51) Int. Cl.
*G06K 9/00* (2006.01)

(52) U.S. Cl. ...................... 382/100; 382/191; 382/162; 348/161; 340/577; 250/339.15

(58) Field of Classification Search ................ 382/100, 382/162, 218, 191–92; 348/82, 143–44, 348/152, 154, 159, 161; 340/577–78; 250/339.15; 356/438
See application file for complete search history.

(56) References Cited

U.S. PATENT DOCUMENTS

| | | | |
|---|---|---|---|
| 4,059,385 | A | 11/1977 | Gulitz et al. |
| 4,101,767 | A | 7/1978 | Lennington et al. |
| 4,455,487 | A | 6/1984 | Wendt |
| 4,533,834 | A | 8/1985 | McCormack |
| 4,603,255 | A | 7/1986 | Henry et al. |
| 4,701,624 | A | 10/1987 | Kern et al. |
| 4,742,236 | A | 5/1988 | Kawakami et al. |
| 4,769,775 | A | 9/1988 | Kern et al. |
| 5,153,722 | A | 10/1992 | Goedeke et al. |

(Continued)

FOREIGN PATENT DOCUMENTS

| | | |
|---|---|---|
| JP | 11 224389 | 11/1999 |
| WO | 01/01185 | 1/2001 |

*Primary Examiner*—Jingge Wu
*Assistant Examiner*—Shefali Patel
(74) *Attorney, Agent, or Firm*—Merchant & Gould P.C.

(57) ABSTRACT

An apparatus and method for performing first and second imaging processes contemporaneously, in particular where one of the processes is detecting fires based on images of the flames. The apparatus includes an image sensor for producing a video image, a frame grabber for capturing first frames and second frames, a processor for processing the data within the frames, and an output device. The apparatus may also include an adjustment mechanism for adjusting the image settings of the image sensor between settings suitable for flame imaging and non-flame imaging, and a control mechanism for controlling the image settings of the image sensor. In the method at least two first frames are obtained, and a plurality of second frames are obtained. The first and second frames are used for first and second processes. The first and second processes are contemporaneous, so that they are carried out within the same time period without interfering with one another. When the first process is flame detection, individual pairs of pixels having a property such as intensity that meets a first threshold are identified within the first frames, and are assembled into blobs. Additional properties of the pixel pairs and the blobs overall are evaluated in relation with additional thresholds. Blobs or pixels that do not meet the thresholds are excluded. Any blobs remaining after all evaluations are considered fires.

28 Claims, 4 Drawing Sheets

100

U.S. PATENT DOCUMENTS

| | | | |
|---|---|---|---|
| 5,155,468 | A | 10/1992 | Stanley et al. |
| 5,289,275 | A | 2/1994 | Ishii et al. |
| 5,311,167 | A | 5/1994 | Plimpton et al. |
| 5,510,772 | A | 4/1996 | Lasenby |
| 5,547,369 | A | 8/1996 | Sohma et al. |
| 5,598,099 | A | 1/1997 | Castleman et al. |
| 5,677,532 | A | 10/1997 | Duncan et al. |
| 5,773,826 | A | 6/1998 | Castleman et al. |
| 5,777,548 | A | 7/1998 | Murakami et al. |
| 5,926,280 | A | 7/1999 | Yamagishi et al. |
| 5,937,077 | A | 8/1999 | Chan et al. |
| 6,011,464 | A | 1/2000 | Thuillard |
| 6,164,792 | A | 12/2000 | Nakagome |
| 6,184,792 | B1 | 2/2001 | Privalov et al. |
| 6,844,818 | B1 * | 1/2005 | Grech-Cini ................. 340/628 |
| 6,940,998 | B1 * | 9/2005 | Garoutte ..................... 382/103 |

* cited by examiner

100

200

METHOD AND APPARATUS OF DETECTING FIRE BY FLAME IMAGING

BACKGROUND OF THE INVENTION

This invention relates to an apparatus and method for detecting fires by analysis of images of potential flames.

Fires emit a range of wavelengths. The art of optical fire detection is based upon sensing types of light that are characteristic of fires. More sophisticated detectors also analyze the light to exclude possible false alarms.

It is well known to use one or several individual sensors in a fire detector. Typically the sensors are sensitive to particular infrared and/or ultraviolet wavelength bands of light that are known to be present in most fires.

A significant disadvantage of such detectors is that they are subject to false alarms, as many non-flame sources also produce infrared and ultraviolet light in the same wavelength bands. Common false alarm sources include but are not limited to artificial lighting, sunlight, and arc welding. One source of false alarms that is particularly troublesome is that of reflections. Reflections from water, metal, etc. can in many ways mimic actual fires. This is especially true when the source of the reflection is an actual fire. There are many circumstances, for example petroleum drilling and refining, wherein known actual fires are present proximate the detector but outside the area being monitored.

More recently, it has become possible to use electronic cameras to produce images which are then analyzed to identify potential fires, a process called “flame imaging”. Flame imaging allows for precise detection of the location of flames within the area protected, since the location of flames within the image may be clearly identified. In addition, electronic cameras produce images with a large number of picture elements (or pixels), typically at least several thousand and up to at least several million. It will be appreciated that this large number of pixels can provide data regarding flames that simply cannot be obtained from a fire detector having only one or at most a few sensors. However, as with individual sensors, flame image analysis is often subject to false alarms.

Indeed, known flame imaging systems often may be more susceptible to false alarms than individual sensors. A wide variety of image artifacts may trigger false alarms by virtue of their brightness, color, shape, motion, etc. Because of this, flame imaging systems are often relied upon to confirm fires identified by conventional flame detectors, rather than to detect fires independently.

A further problem with conventional flame image systems is that the image settings appropriate for flame imaging are not appropriate viewing non-flame images. This is especially true indoors, at night, or in other poorly lit environs. Because flames are extremely bright, image settings (exposure time, iris, etc.) must be selected so as to properly expose the flame. In this way, the images of the bright flames show sufficient detail for analysis. However, at such image settings the remaining (non-flame) portion of the image can be so dark that almost nothing can be seen in it. In particular, objects and persons that may be distant from the flame cannot normally be identified, either by humans or by data processing routines. As a result, an image optimal for flame detection is not optimally suited for other purposes, in particular human viewing, because practically nothing but the flames can be distinguished.

Conversely, if the image settings are such that objects and persons can be identified, the image is “overexposed” so that flames generally appear as shapeless, poorly defined bright spots. These images reveal little or no structure or color within the flame itself, thus limiting meaningful analysis. Indeed, at such settings it can be difficult even to determine whether a bright spot is a fire at all, or whether it is some other bright phenomenon such as reflected sunlight or an incandescent bulb.

For this reason, flame imaging systems conventionally require dedicated cameras, useful for no other purpose.

Conventional methods for processing the data obtained from flame imaging cameras also have disadvantages. Typically, known flame imaging systems process image data in one of two ways. First, the data present in a single image may be analyzed on its own. This has the advantage of minimizing the number of calculations necessary, since the data is limited to what is present in a single image. However, analysis of a single image does not yield any information related to changes in the image over time. Flames change in shape, size, position, etc. over the course of time, and analysis of these changes can be useful both for detecting flames and for excluding false alarms. Such analysis is not possible with only a single image.

SUMMARY OF THE INVENTION

It is the purpose of the claimed invention to overcome these difficulties, thereby providing an improved apparatus and method for detecting fires by flame imaging.

It is more particularly the purpose of the claimed invention to provide a method for performing two contemporaneous imaging processes. Exemplary embodiments of the claimed invention may include a method and apparatus wherein one of those processes is flame imaging, wherein the flame imaging is both sensitive to actual fires and resistant to false alarms, does not require undue processing power, and enables contemporaneous use of a camera or similar video sensor for flame imaging and processes other than flame imaging.

The term “contemporaneous” as used herein is meant to indicate that both processes (or all processes, in embodiments that perform more than two processes) are ongoing over time, and within the same general time interval. In addition, it indicates that the first and second processes can both be performed without one compromising the effectiveness of the other.

However, it is noted that the term contemporaneous as used herein does not necessarily imply that processes are fully simultaneous.

For example, although a method for performing two contemporaneous imaging processes in accordance with the principles of the claimed invention includes the steps of contemporaneously performing first and second processes, the first and second processes may not both be performed at every measurable instant. It is only necessary that both processes are carried out effectively over time.

Contemporaneous, as the term is used herein, is a functional definition, not an indication of a particular time relationship. The precise timing may vary from embodiment to embodiment of the claimed invention depending on the nature of the first and second processes. For example, a particular flame detection process might be functional with only two frames per second, while a particular real-time video monitoring process might require twenty or more frames per second for acceptable functionality. In such a case, the flame detection process might only be active for two brief intervals during every second, while the video monitoring process is active more or less continuously. The two processes might never actually both be active at precisely the same instants. Nevertheless, the two processes are considered to be concurrent so long as both the first process and the second process function appropriately over time.

There are of course limits as to whether two processes are contemporaneous, and as to whether they are functioning appropriately. A person of ordinary skill in the art would not consider most flame detection processes to be functional if they were activated only once per minute. Even though flame detection might be considered to be "ongoing" by some definition of the word, most flame detection processes would not be functional at such a frequency, since a flame can occur and grow to a substantial threat in one minute or less. Thus, such a process would not be contemporaneous with a second process performed by the same device, since it is not performed effectively.

Acceptable functionality, as would be understood by a person of ordinary skill in the art, is the key criterion for interpreting contemporaneousness in the context of the claimed invention. Processes are considered contemporaneous so long as their functional needs are met.

It is noted that in order to fulfill the requirement that first and second processes are performed, either the data derived from the video sensor and input into the first and second processes, or the processes themselves, or both, must be different. If the image data used by the first and second processes is identical, the image processing performed using that data must be different. If the processes are identical, the image data derived from the image sensor must be different for each process.

It is not sufficient within the scope of the claimed invention to merely perform exactly the same process twice. A video camera that produces a signal which is merely split, with copies thereof being sent to separate video monitors, is not performing a first and a second process in accordance with the principles of the claimed invention, since the image data and the processing is the same for both monitors.

Even outputting the data to a video monitor and to a video recording unit would not satisfy the requirements of the claimed invention, if the image data is the same in both cases.

In both the cases of displaying video data on a monitor and recording it, the data is essentially unprocessed. It might also be said to undergo a "null process". However, regardless of the term, no appreciable image processing has been performed in either case, so this is merely a matter of using two output devices for the same image process, based on the same image data.

The use of a null process as one of the first and second processes is not excluded, so long as the other of the first and second processes comprises some other form of data processing, i.e., is not null processing, and/or the image data for the first and second processes is different.

An embodiment of a method for performing two contemporaneous imaging processes in accordance with the principles of the claimed invention includes the step of generating a video image. At least two first frames and a plurality of second frames are obtained from the video image. First and second processes are then performed using the first and second frames respectively. The first and second processes are performed contemporaneously, such that performing one process does not significantly interfere with the other.

In certain embodiments, the first and second frames may be exclusive. That is, obtaining the first frames reduces the portion of the video image that is available to produce second frames.

Alternatively, in other embodiments, the first and second frames may be non-exclusive, such that obtaining the first frames does not reduce the portion of the video image that is available to produce second frames.

The first and second frames may be obtained with different image settings.

For example, if the first process is flame detection, the image settings for the first frames may be such that the first frames are relatively underexposed. Because flames are very bright, relatively dark images are often preferred when imaging flames. However, if the second process is the generation of a human-viewable image, the image settings for the second frames may be such that the second frames are much brighter. Because persons and solid objects are generally much dimmer than flames, it is often necessary to make the images brighter overall in order to make the objects and persons therein clearly visible.

The video image may be a color image. Likewise, the first and second frames may be color frames. This enables analysis of the image based on the color of objects therein.

As noted previously, the first process may include flame detection.

An exemplary first process for flame detection may include the steps of generating a base frame and comparison frame as the first frames. Each of the base and comparison frames have a plurality of pixels, such that for every pixel in the base frame there is one spatially corresponding pixel in the comparison frame. Each base pixel and its corresponding comparison pixel make up a pair. Thus, the first frames may be considered as a plurality of pixel pairs.

In the exemplary first process, at least some of the pairs are evaluated individually according to a first property, such as a difference in overall intensity between the base and comparison pixels of the pairs. If a first threshold for the first property of the pairs is met, the pairs are considered to be blob pairs. The blob pairs are assembled into blobs based on the status of nearby pairs. It is noted that blobs are constructs for evaluating whether a fire is present. Although a blob represents a potential fire, it is not necessarily assumed to be a fire. Although for certain applications, detecting a blob may be considered sufficient to indicate the presence of a fire, blobs also may be excluded as non-fires by further analysis.

For embodiments wherein further analysis is desired, the pairs making up the region of interest may be evaluated according to a second property. The second property is different from the first property, but may represent any of a variety of physical parameters, including but not limited to the color of the individual pairs, the difference in brightness of individual pairs, the difference in color of individual pairs, the variation in brightness between pairs, the variation in color between pairs, the geometry of the blobs, the motion of the blobs, the aggregate brightness of the blobs, and the aggregate color of the blobs. Individual pairs and/or entire blobs are evaluated to determine whether they meet a second threshold.

Similarly, the blobs and/or the individual pairs making up the blobs may be evaluated according to a third property, a fourth property, a fifth property, etc. Each property may either meet or not meet a third threshold, fourth threshold, fifth threshold, etc. The properties may be selected so as to avoid identifying non-fire sources as fires.

The results of these evaluations are then in turn evaluated to determine whether a blob will be considered either a fire or a non-fire. This evaluation may be performed in a variety of ways. In a simple embodiment, for example, the results could be logically ANDed together. Other embodiments may include histogram plots, frequency comparisons, calculation of derivatives, evaluation of previous historical image data, and/or other evaluative steps.

In an exemplary embodiment, regardless of the particular analyses performed, a minimum number of positive results would be required to yield a determination that a particular represents a fire, and that therefore a fire is present in the viewing area of the video sensor. If a fire is determined to be present, an alarm signal is sent. Alarm signals may be used for various purposes, including but not limited to fire alarm control panel input, video system input, fuel source shut-off, activation of audible and/or visible alarms, and the release of fire suppressants.

It is also the purpose of the claimed invention to provide a method of adjusting a video sensor.

In an embodiment of a method for adjusting a video sensor according to the principles of the claimed invention, the method may include the steps of adjusting a video sensor to first image settings, and obtaining at least two first frames. The video sensor is then adjusted to second image settings, and a plurality of second frames are obtained.

Alternatively, the method may include the steps of adjusting a video sensor to first image settings, obtaining a base frame, and adjusting the video sensor to second image settings. At least one second frame is obtained at the second image settings. The video sensor is then adjusted again to the first image settings, a comparison frame is obtained, and the video sensor is adjusted back to the second image settings again, after which at least one additional second frame is obtained at the second image settings.

That is, it is not necessary for the first frames (i.e. a base frame and a comparison frame) to be consecutive. Rather, one or more second frames may be obtained between the first frames.

The first and second image settings may differ considerably, so as to be suitable for different applications. In an exemplary embodiment, the first image settings may be suitable for fire imaging, and the second image settings may be suitable for non-fire imaging.

Regardless of the precise image settings or the order in which the frames are obtained, the first frames and second frames may be obtained in such a fashion that they are usable in first and second contemporaneous processes. For example, the steps of adjusting the image settings and obtaining the first frames may be performed very rapidly, so as not to significantly affect the steps of the second process. When the amount of time used to generate the first frames is relatively small, the camera is free to be used for other purposes when first frames are not being obtained.

It is furthermore the purpose of the claimed invention to provide an apparatus for performing multiple contemporaneous imaging processes.

An apparatus in accordance with the principles of the claimed invention includes a video sensor adapted for generating a video image. A frame grabber is in communication with the video sensor, so as to obtain at least two first frames and a plurality of second frames from the video sensor. A processor is in communication with the frame grabber. The processor is adapted to contemporaneously perform a first process using the first frames and a second process using the second frames. The apparatus also includes at least one output device in communication with the processor, adapted to generate a first output from the first process, and a second output from the second process.

In an exemplary embodiment of an apparatus in accordance with the principles of the claimed invention, the frame grabber obtains a base frame and a comparison frame as the first frames. The processor identifies a plurality of pixels in each of the base and comparison frames, each base pixel being correlated with a spatially corresponding comparison pixel so as to form a plurality of pairs.

In such an exemplary embodiment, the processor is adapted to evaluate at least some of the pairs according to a first property. The processor is adapted to identify individual pairs as blob pairs if a first threshold value for the first property of the pairs is met, and to assemble the blob pairs into blobs.

Such an arrangement is suitable for first processes including, but not limited to, flame detection.

The processor may be further adapted to evaluate each pair within the region of interest according to a second property, and to identify individual pairs and/or blobs as either meeting or not meeting a second threshold.

Similarly, the processor may be adapted to evaluate individual pairs and/or blobs according to a third property, a fourth property, a fifth property, etc. as to whether they meet or do not meet a third threshold, fourth threshold, fifth threshold, etc.

In embodiments wherein the first process is flame detection, the processor also may be adapted to identify one or more blobs as indicative of a fire, based on the results of the previous evaluations.

The apparatus includes an output mechanism in communication with the processor, adapted to generate a first output from the first process, and a second output from the second process. Suitable output devices include, but are not limited to, a fire alarm control panel, video switching equipment, a video monitor, an audible or visible alarm, a recording mechanism such as a video recorder, a fire suppression-mechanism, and a cut-off mechanism for fuel, electricity, oxygen, etc.

The apparatus may also include an adjusting mechanism for adjusting the image settings of the video sensor, and a control mechanism in communication with the processor and the adjusting mechanism, the control mechanism being adapted for controlling the image settings of the video sensor so as to switch between image settings for generating the first frames and image settings for generating the second frames. For example, in an exemplary embodiment wherein the first process is flame detection, the control mechanism and adjusting mechanism may be adapted to adjust the image settings between settings suitable for flame imaging and settings suitable for non-flame imaging.

An embodiment of a method in accordance with the principles of the claimed invention includes the step of generating a video image. At least two first frames and a plurality of second frames are obtained from the video image. First and second processes are then performed using the first and second frames respectively. The first and second processes are performed concurrently, such that performing one does not significantly interfere with performing the other.

The first and second frames may be related in a variety of manners.

In certain embodiments, the first and second frames may be exclusive. That is, obtaining the first frames reduces the portion of the video image that is available to produce second frames.

For example, many conventional video sensors produce video images as a series of consecutive frames, typically measured in frames per second. If, out of a one-second series of frames, two are generated as dedicated first frames, such a conventional video sensor will not simultaneously produce second frames for the fraction of a second necessary to produce the two first frames.

Alternatively, in other embodiments, the first and second frames may be non-exclusive, such that obtaining the first frames does not reduce the portion of the video image that is available to produce second frames.

For example, it is possible in principle to construct a video sensor that is sensitive to a dynamic range large enough to encompass both fire and non-fire, i.e. human viewable, images, and that has sufficient dynamic resolution to provide useful information about both fires and non-fire objects. Such a sensor could produce an image wherein low intensity values would clearly depict non-fire objects and people, but wherein high intensity values would clearly depict a fire.

It is noted that any visual image possesses a certain range of values therein. For example, in a simple black and white image, there is some range between the darkest shade (black) and the lightest shade (white) therein. This range is referred to herein as the dynamic range.

In addition, for any visual image the dynamic range can be split into some maximum number of values. A simple line drawing, for example, may have only two values, black and white. Of course, many so-called black and white images include shades of gray, and color images include one or more shades for each color. The number of values into which an image's dynamic range can be divided is referred to herein as the dynamic resolution.

Dynamic range is commonly expressed in bits. The number of separate values that can make up an image is equal to 2 to the exponent N, wherein N is the number of bits. Thus, a one bit image has only two values, such as black and white. An 8 bit image may have up to 256 values, and a 24 bit image may have up to 16,777,216 values.

Depicting both fire and non-fire objects in the same image requires a very broad dynamic range, since the difference in intensity between a fire and most non-fire objects is very large. It also requires a high dynamic resolution, since such a broad dynamic range must be split into many levels in order to provide useful information regarding small portions (i.e., the flame and non-flame portions) thereof.

It is noted that reliable, cost-effective video sensors with sufficient dynamic range and dynamic resolution are not known to be available at the time of this filing. However, the principles of the claimed invention include such an embodiment if and when such a sensor becomes available.

Most conventional video sensors have a dynamic resolution of approximately 8 bits (256 levels). Although it might be possible to set an 8 bit video sensor to cover the full range of intensities necessary to detect both fires and non-fire objects, because of the large intensity difference, fires would be represented with only a very few of the 256 available levels at the top of the dynamic range, and non-fires with only a very few levels at the bottom of the dynamic range. As a result, the image quality for both fires and non-fires would be so poor as to preclude useful analysis.

However, with a video sensor having a sufficiently large dynamic resolution, each frame of the video image could be utilized in its entirety by both the first and second processes. Thus, the first and second frames would be identical to one another, although the first and second processes for which the first and second frames are used might differ greatly. Such an arrangement has the advantage of simplicity, and also provides for very comprehensive analysis, since a very broad range of data is available for both the first and the second processes.

Alternatively, with a video sensor having such a broad dynamic range and a sufficiently large dynamic intensity, the first and second frames could be produced by "clipping" a portion of the dynamic range of the video image.

For example, if the video sensor produces a 24 bit image, 8 bit portions could be removed or copied from the image to produce the first frames and the second frames. An 8 bit portion near the top of the dynamic range could be used to detect fires, for example, and an 8 bit portion near the bottom of the dynamic range could be used to produce a human-viewable image.

In such a case, rather than processing a 24 bit frame (with 16,777,216 levels) twice (once for each of the first and second processes), two 8 bit frames (with only 256 levels each) could be processed instead. This has the advantage of reducing the processing load.

As another alternative, the first and second frames could be generated simultaneously.

Conventional electronic video sensors such as CCD (charge-coupled device) and CMOS (complementary metal oxide semiconductor) sensors absorb light that strikes an array of receptors and convert the light into electric charge. The charge from each receptor is then converted into an array of pixels that form an image. In some applications, the charge generated by each receptor is dissipated when the receptor is read, thereby resetting the receptor for the next image.

However, if the charge is measured without dissipating it, the sensor can be used to simultaneously generate two images with different light levels. For example, the charge could be allowed to accumulate until a first time, at which point the charge at each receptor would be measured, and a first frame would be created. Without first dissipating the charge, the receptors would be allowed to continue to accumulate charge until a second time, at which point the charge at each receptor would be measured again, and a second frame would be created.

The image taken at the first time will be generally darker than the image taken at the second time, since less charge will have accumulated. Thus, two distinct frames are created with the same start time, using the same video sensor, but with different illumination levels.

With such an arrangement, the first frames of the claimed invention could be formed with the second frames, but at different light levels, so that the first and second frames could be used for different first and second processes.

BRIEF DESCRIPTION OF THE DRAWINGS

Like reference numbers generally indicate corresponding elements in the figures.

DETAILED DESCRIPTION OF THE PREFERRED EMBODIMENT

As noted previously, an apparatus 10 in according with the principles of the claimed invention is adapted to generate at least two first frames and a plurality of second frames, and to contemporaneously perform first and second processes therewith.

Figure 1:
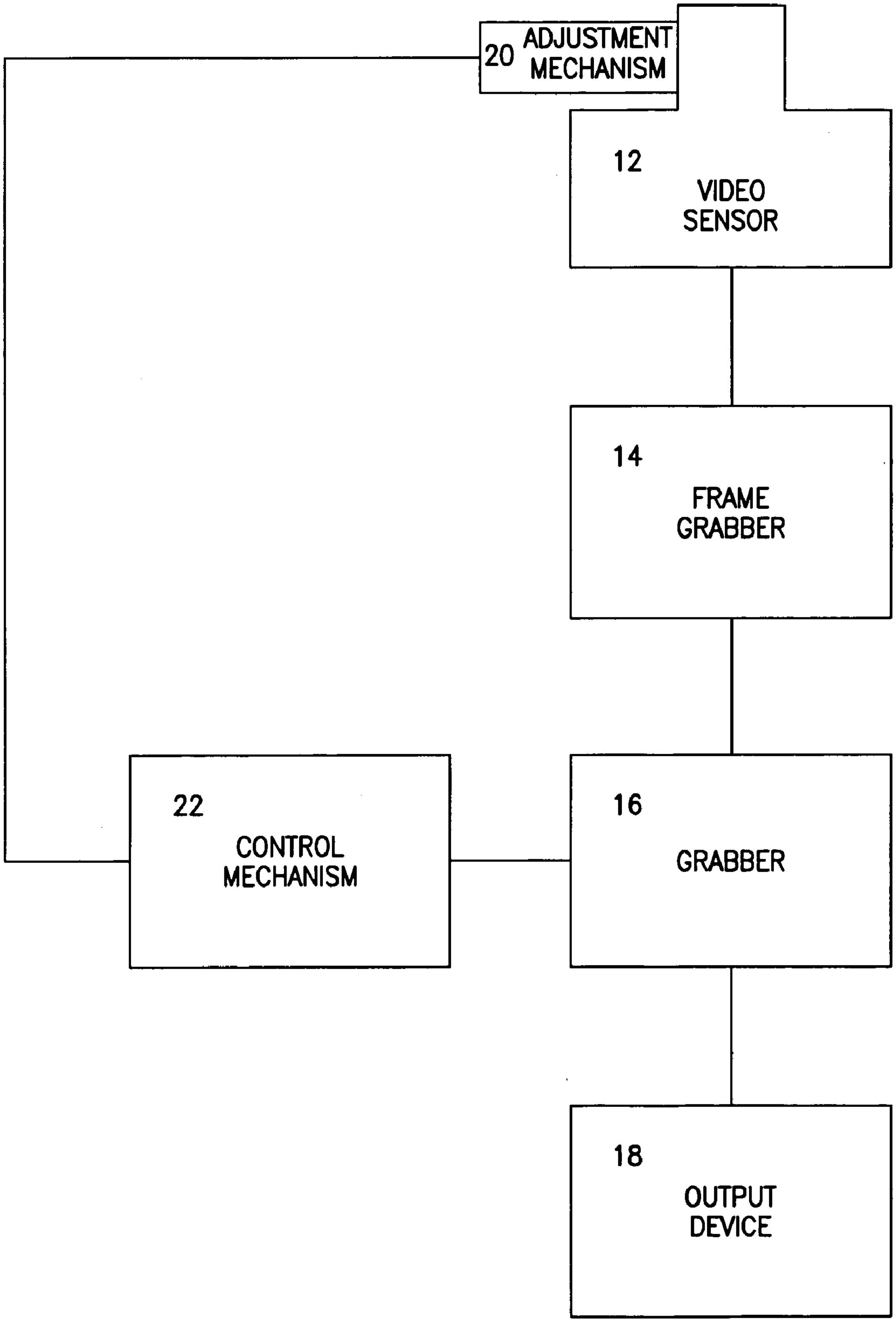
FIG. 1 is a schematic representation of an apparatus in accordance with the principles of the claimed invention.

Referring to FIG. 1, an apparatus 10 in accordance with the principles of the claimed invention includes a video sensor 12. In a preferred embodiment of the apparatus, the video sensor 12 is a conventional digital video camera. This is convenient, in that it enables easy communication with common electronic components. However, it will be appreciated by those knowledgeable in the art that this choice is exemplary only, and that a variety of alternative video sensors 12 may be equally suitable, including but not limited to analog video cameras. In a preferred embodiment, the video sensor 12 is a color video sensor 12, adapted for obtaining color image, i.e. images that distinguish between different wavelengths of light. However, it will be appreciated that this is exemplary only, and that black and white video sensors may be equally suitable.

Although the term "color" is sometimes used to refer particularly to a specific hue within the visible portion of the electromagnetic spectrum, the term "color" as used herein is not limited only to the visible portion of the spectrum. A video sensor adapted to distinguish between wavelengths outside the visible spectrum, i.e. in the infrared and/or ultraviolet, is also considered to be a color video sensor with respect to the claimed invention.

Similarly, referring to a system or device as "monochrome" does not imply that it necessarily is sensitive to visible light, or to visible light only. Video sensors adapted to sense infrared and/or ultraviolet light are also included in this term.

In addition, it is noted that although the term "video" is sometimes used to refer particularly to systems for continuous analog recording, such as those used for home entertainment systems, the term is used herein more generally. With regard to the claimed invention, a "video sensor" is any optical imaging device capable of performing the functions specified herein and recited in the appended claims, including but not limited to digital imaging systems. Thus, as used herein, the term "video" encompasses not only conventional consumer systems but also other forms of imaging, digital and analog, color and monochrome. As noted previously, both color and monochrome systems may include sensitivity to light other than that in the visible spectrum.

Video sensors are well known, and are not further described herein.

The video sensor 12 is in communication with a frame grabber 14. The frame grabber 14 is adapted for obtaining first and second frames from the video sensor 12 and transmitting them to other devices. In particular, the frame grabber 14 is adapted for rapidly obtaining successive images one after another, with a relatively short space of time between images.

In a preferred embodiment, the video sensor 12 is adapted to generate an image comprising at least 30 frames per second, and the frame grabber 14 is adapted for obtaining two successive images approximately 1/30th of a second apart. It is noted that this is convenient for certain applications, in that a rate of 30 frames per second is a common video frame rate. However, it will be appreciated by those knowledgeable in the art that this choice is exemplary only, and that different image generation and frame grabbing capabilities may be equally suitable.

In embodiments wherein the video sensor 12 is a color video sensor, the frame grabber 14 may be a color frame grabber, adapted to grab color frames.

It is emphasized that although the term "frame grabber" is sometimes used to describe a particular type of device that obtains images using specific hardware and imaging algorithms, as used with respect to the claimed invention, the term "frame grabber" refers to any mechanism by which individual frames may be obtained from a video image and rendered suitable for computational analysis.

The particular devices suitable for this application may vary considerably depending upon the specific purpose of a given embodiment of the claimed invention, and likewise upon the particulars of the other components of the invention. For example, the type of video sensor used may determine to some extent what type of frame grabbers may be suitable. Thus, the claimed invention is not limited to any particular frame grabber mechanism.

It is also noted that although the frame grabber 14 is referred to herein as a separate component, this is done as a convenience for explanation only. Although in certain embodiments, the frame grabber 14 may indeed be a distinct device, in other embodiments the frame grabber 14 may be incorporated into another element of the invention, such as the video sensor 12. For example, some digital cameras include circuitry therein that generates images from the sensors, without the need for a separate frame grabber 14. However, the functionality assigned herein to the frame grabber 14, namely, that it is adapted to generate first and second frames, is present even in such devices. It is the functionality of the frame grabber 14, not the physical presence of any particular device, that is necessary to the claimed invention.

Frame grabbers are well-known, and are not further discussed herein.

The useful dynamic resolution of the frames is equal to the lesser of the dynamic resolutions of the video sensor 12 and the frame grabber 14. For example, if the video sensor 12 generates 8 bit images, the frames grabbed by the frame grabber 14 effectively will be 8 bit frames, even if the frame grabber 14 has more than 8 bits of dynamic resolution. Conversely, if the frame grabber 14 has 8 bits of dynamic resolution, the frames will be 8 bit frames, even if the video sensor 12 has higher dynamic resolution.

Therefore, in an exemplary embodiment, the frame grabber 14 is adapted to grab frames with a dynamic resolution equal to the dynamic resolution of the video sensor 12. However, this arrangement is exemplary only, and it may be equally suitable for certain embodiments if the dynamic resolutions of the video sensor 12 and the frame grabber 14 are different.

In a preferred embodiment, the video sensor 12 has a dynamic resolution of at least 8 bits. In another preferred embodiment, the frame grabber 14 has a dynamic resolution of at least 8 bits.

In a more preferred embodiment, the video sensor 12 has a dynamic resolution of at least 24 bits. In another preferred embodiment, the frame grabber 14 has a dynamic resolution of at least 24 bits.

However, these dynamic resolutions are exemplary only, and other dynamic resolutions may be equally suitable for certain embodiments.

For example, in certain embodiments it may be advantageous for the video sensor 12 to have a higher dynamic resolution than the frame grabber 14, and for the frame grabber 14 to generate images that comprise only one or more portions of the dynamic range of the video sensor 12. In a more particular example, if the video sensor 12 has a dynamic resolution of 24 bits, it may be suitable for the frame grabber 14 to grab 8 bit frames that comprise only a portion of the dynamic range of the image from the video sensor 12. One such portion might be useful for one purpose, i.e. detecting flames, while another such portion might be useful for another purpose, i.e. monitoring persons and objects.

It is noted that in certain embodiments, the video sensor 12 and the frame grabber 14 may be integral with one another. That is, the video sensor 12 may include the ability to grab individual frames, without a separate frame grabber 14. The precise arrangement of the mechanisms making up the apparatus 10 is unimportant so long as the apparatus 10 as a whole performs the functions herein attributed to it.

The frame grabber 14 is in communication with a processor 16. The processor 16 is adapted to process the data contained within the first frames and second frames.

In particular, in certain exemplary embodiments, the processor 16 is adapted to analyze the data within the at least two first frames so as to identify the presence of flame therein.

In a preferred embodiment, the processor 16 consists of digital logic circuits assembled on one or more integrated circuit chips or boards. Integrated circuit chips and boards are well-known, and are not further discussed herein.

In embodiments wherein the video sensor 12 is a color video sensor and the frame grabber 14 is a color frame grabber, the processor 16 may be adapted to process information from color frames.

The processor 16 is adapted to communicate with at least one output device 18. A variety of output devices may be suitable for communication with the processor, including but not limited to video monitors, video tape recorders or other storage or recording mechanisms, hard drives, visible alarms, audible alarms, fire alarm and control systems, fire suppression systems, and cut-offs for fuel, air, electricity, etc. The range of suitable output devices is extremely large, and includes essentially any device that could receive the output from the processor. Output devices are well-known, and are not further discussed herein.

It will be appreciated by those knowledgeable in the art that although the video sensor 12 by necessity must be located such that its field of view includes the area to be monitored for fires, the frame grabber 14, the processor 16, and the output device 18 may be remote from the video sensor 12 and/or from one another. As illustrated in FIG. 1, these components appear proximate one another. However, in an exemplary embodiment, the video sensor 12 could be placed near the area to be monitored, with the frame grabber 14, processor 16, and output device 18 located some distance away, for example in a control room.

It will also be appreciated by those knowledgeable in the art that an apparatus in accordance with the principles of the claimed invention may include more than one video sensor 12. Although only one video sensor 12 is illustrated in FIG. 1, this configuration is exemplary only. A single frame grabber 14 and processor 16 may operate in conjunction with multiple video sensors 12. Depending on the particular application, it may be advantageous for example to switch between video sensors 12, or to process images from multiple video sensors 12 in sequence, or to process them in parallel, or on a time-share basis.

Similarly, it will be appreciated by those knowledgeable in the art that an apparatus in accordance with the principles of the claimed invention may include more than one output device 18. Although only one output device 18 is illustrated in FIG. 1, this configuration is exemplary only. A single processor 16 may communicate with multiple output devices 18. For example, depending on the particular application, it may be advantageous for the processor 16 to communicate with a video monitor for human viewing of the monitored area, a storage device such as a hard drive or tape recorder for storing images and/or processed data, and an automatic fire alarm and control panel or fire suppression system.

In certain embodiments, it may be advantageous to define the image from the video sensor 12 and/or the frames grabbed by the frame grabber 14 digitally, in terms of discrete picture elements (pixels).

In such embodiments, at least one of the video sensor 12, the frame grabber 14, and the processor 16 is adapted to define images in terms of discrete pixels. In a preferred embodiment of an apparatus in accordance with the principles of the claimed invention, the video sensor 12 is a digital video sensor, and defines images as arrays of pixels when the images are first detected.

However, the point at which pixels are defined is not critical to the operation of the device, and an analog video sensor and/or frame grabber may be equally suitable. In such a case, the processor and/or the frame grabber may be adapted to identify pixels within the images.

It will be appreciated that many available video sensors are analog devices; such devices may be suitable for use with the claimed invention. Thus, retrofitting of existing video sensors and/or frame grabbers, or use of available analog video sensors and/or frame grabbers, may be suitable.

The use of discrete pixels may be convenient for certain applications, since many common video sensors, frame grabbers, and processors are adapted to utilize digital information. However, such an arrangement is exemplary only, and embodiments that do not utilize discrete pixels may be equally suitable.

In certain embodiments, the video sensor 12 includes an adjustment mechanism 20 adapted to adjust the image settings of the video sensor 12 between at least a first and a second configuration. Image settings include but are not limited to exposure values such as gain, iris, and integration time. In such an arrangement, in the first configuration, the video sensor 12 is adapted to generate first frames. In the second configuration, the video sensor 12 is adapted to generate second frames.

The use of an adjustment mechanism 20 is exemplary only. Although for certain embodiments it may be useful for generating the first and second frames, in certain other embodiments it may not be required, as described below.

Adjustment mechanisms 20 are well-known, and are not further discussed herein.

In embodiments that include an adjustment mechanism 20, the fire detection apparatus 10 may include a control mechanism 22 in communication with the processor 16 and the adjustment mechanism 20, the control mechanism 22 being adapted to control the adjustment mechanism 20.

The use of a control mechanism 22 is exemplary only. For some embodiments, including some embodiments that include an adjustment mechanism, it may be equally suitable to omit the control mechanism entirely.

The apparatus 10 may be adapted to obtain the first and second frames in a variety of ways.

In certain embodiments, the first and second frames may be exclusive. That is, obtaining the first frames reduces the portion of the video image that is available to produce second frames.

For example, in certain embodiments, the video sensor 12 may produce a video image that consists of a sequence of consecutive image frames. Two or more of those image frames may be generated specifically as first frames, while the remainder are generated specifically as second frames.

One exemplary arrangement for producing the first and second frames in this fashion is to vary the image settings of the video sensor 12, as described above with regard to the adjustment mechanism 20.

For example, the video sensor 12 could be set to first image settings, and at least two first frames could be generated at those settings. The video sensor 12 would then be adjusted to second image settings, and a plurality of second frames could be generated. This process could be repeated indefinitely.

This arrangement is sometimes referred to as "frame stealing" or "time stealing", since the majority of the frames generated are second frames for the second process, and the first frames are "stolen" from the series of second frames. However, so long as the first and second processes are still performed effectively together, they are considered contemporaneous, even though occasional frames may be "stolen" from the second process for use in the first process.

This arrangement may be advantageous for certain embodiments, for at least the reason that it enables the use of relatively simple, inexpensive components. The video sensor 12 may have a relatively narrow dynamic range and a relatively low dynamic resolution, i.e. 8 bits or less. Likewise, the frame grabber 14 may have a relatively narrow dynamic range and a relatively low dynamic resolution. As a result, the processor 16 need only be able to handle a relatively small amount of video information, since only data needed for the first and second processes is gathered and processed. Despite this, the overall performance of the system is quite high, since adjustment of the image settings makes it possible to obtain image data for essentially any first and second processes.

The sequence of adjustment may be more complex than that described above. For example, as described above, the at least two first frames are generated from consecutive image frames. However, this is exemplary only. For example, in certain embodiments it may not be necessary to obtain the at least two first frames consecutively. The video sensor 12 could be adjusted back and forth between first and second image settings several times to obtain the necessary number of first frames, with one or more second frames interspersed between the first frames.

As a brief digression, it is noted that although the preceding comments regarding whether the at least two first frames are generated consecutively are made in the course of describing an embodiment of an apparatus in accordance with the principles of the claimed invention wherein the first and second frames are exclusive, they apply also to embodiments wherein the first and second frames are not exclusive. Regardless of the particular arrangements for producing the first frames, they may be either consecutive or non-consecutive, depending upon the particular embodiment.

Similarly, in certain embodiments it may be advantageous to generate more than two first frames, regardless of the particular arrangements for producing the first frames.

Returning to the matter of an embodiment wherein the first and second frames are exclusive, it is noted that the adjustment mechanism 20 and control mechanism 22 are particularly advantageous for such embodiments, since they enable rapid and convenient adjustment of the image settings of the video sensor 12. However, they are exemplary only.

The precise values of the first and second image settings depend upon the nature of the first and second processes. For example, if the first process is flame detection, a relatively brief exposure might be suitable for obtaining the first frames. In contrast, if the second process is imaging non-flame objects and persons, a longer exposure might be appropriate.

Likewise, the precise image settings that are adjusted depend upon the circumstances. If, for example, the time separation between consecutive frames is short, i.e. 1/30th of a second, it may be preferable to adjust one or more image settings that respond rapidly.

For example, gain and exposure functions are conventionally electronic in nature, and can be rapidly adjusted electronically using conventional mechanisms, such as those found in auto-adjusting cameras. Integration time is commonly a function of electronic hardware and/or software, and can also be adjusted very rapidly. In contrast, conventional iris adjustment is commonly a mechanical function, and at present thus is more appropriate for slower changes to the image settings.

It is noted that, since as described above at least some image settings of a video sensor 12 may be responsive to electronic or software signals, the adjustment mechanism 20 and control mechanism 22 need not include any independent physical structure, but may instead be entirely composed of software for certain embodiments.

It is noted that this arrangement for exclusively generating first and second frames is exemplary only, and that other ways of obtaining exclusive first and second frames may be equally suitable. For example, the frame grabber 14 may be adapted to grab every other pixel in an image frame and assemble them as first frames, likewise assembling the remaining pixels as second frames. Thus, a single image frame would be split into interlaced first and second frames.

Alternatively, in other embodiments, the first and second frames may be non-exclusive. That is, obtaining the first frames does not reduce the portion of the video image that is available to produce second frames. In general terms, this may be accomplished by generating the first frames from at least a first portion of at least two of the image frames, and generating the second frames from at least a second portion of a plurality of the image frames.

This arrangement is sometimes referred to as "image trimming", since the first and second frames are generated by trimming down the image frames to remove information not necessary for their respective first and second processes. This may be advantageous for certain embodiments, for at least the reason that it reduces the amount of data that is processed for each of the first and second processes, and thus reduces the performance demands on the processor 16, without the need to adjust the image settings of the video sensor 12.

For example, as noted previously, in certain embodiments the video sensor 12 may produce a video image that consists of a sequence of consecutive image frames. The image frames may have a dynamic range that includes both the desired dynamic range for the first frames and the desired dynamic range of the second frames.

In such a case, the frame grabber 14 may be adapted to grab a first portion of the dynamic range of the image frames for use in generating the first frames. For example, in an embodiment wherein the first process is flame detection, the first frames would comprise that portion of the dynamic range of the image frames that is suitable for detecting flames, i.e. a portion with relatively high intensity levels.

Likewise, the frame grabber 14 may be adapted to grab a second portion of the dynamic range of the image frames for use in generating the second frames. In an embodiment wherein the second process is non-flame imaging, the second portion might be a portion with relatively low intensity levels.

In such an arrangement, the dynamic resolution of the first and second frames may be different from the dynamic resolution of the image frames, and/or each other.

In a preferred embodiment, the first and second image frames have a dynamic resolution of at least 8 bits.

In another preferred embodiment, the image frames have a dynamic resolution of at least 24 bits.

The first and second portions of the image frames may be mutually exclusive. Continuing the example above, the dynamic range of the first frames and the dynamic range of the second frames may not overlap. This may be convenient if the first and second processes require diverse portions of the dynamic range of the image frames. It may also be convenient if the dynamic range of the frame grabber 14 is relatively small compared to the dynamic range of the video sensor 12. However, such an arrangement is exemplary only.

Alternatively, the first and second portions of the image frames may be non-exclusive. Again continuing the example above, the dynamic range of the first frames and the dynamic range of the second frames may overlap, and include some part of the dynamic range of the image frames in common.

The amount of overlap, if any, may vary. In certain embodiments, the first and second portions may overlap each other entirely, such that they both include the same portion of the image frame. Alternatively, one of the first and second portions may completely overlap the other, or the first and second portions may overlap only in part, or they may not overlap at all.

Depending on the particular arrangement of the first and second portions, and regardless of whether or not the first and second portions overlap, the first dynamic range may extend higher than the second dynamic range. That is, the highest value that may be measured within the first dynamic range may be higher than the highest value that may be measured within the second dynamic range.

Similarly, the second dynamic range may extend lower than the first dynamic range.

However, these arrangements are exemplary only, and other arrangements of the first and second portions may be equally suitable.

In an arrangement for generating the first and second frames non-exclusively by grabbing portions of the image dynamic range, the apparatus 10 is not limited to any particular manner for grabbing the first and second frames as portions of the image dynamic range. Rather, a variety of arrangements may be suitable.

For example, the images may be fully generated by the video sensor 12, whereupon the frame grabber 14 identifies and grabs the appropriate portions of the image dynamic range to generate the first and second frames.

Alternatively, in certain embodiments, it may be desirable to generate the first frames with the second frames, as part of the same process. As previously noted, conventional sensors such as CCDs, which are commonly used in video sensors 12, operate by converting light received into charge, and building up the charge in each sensor element. This process is commonly referred to as "integration". In many conventional sensors, the charge generated is dissipated when it is read, in order to reset the receptor for the next image.

However, if the charge is measured without dissipating it, the sensor can be used to generate two images together with different light levels. For example, the charge could be allowed to accumulate until a first time, at which point the charge at each receptor would be measured, and a first frame would be created. Without first dissipating the charge, the receptors would be allowed to continue to accumulate charge until a second time, at which point the charge at each receptor would be measured again, and a second frame would be created.

The image taken at the first time would be darker than the image taken at the second time, since less charge would have accumulated. Thus, two distinct frames are created with the same start time, using the same video sensor, but with different illumination levels.

These arrangements are exemplary only. Other arrangements of generating the first and second frames non-exclusively from the image frames may be equally suitable.

Alternatively, in still other embodiments, the at least two first frames and the second frames may be equivalent to image frames. It is noted that this arrangement is essentially a special case of the non-exclusive arrangement described above.

In such an embodiment, the whole of each image frame is usable as both a first frame and a second frame. The dynamic range and dynamic resolution of the image frames, first frames, and second frames is the same.

However, it is not necessary for all of the image frames to be used as first frames. That is, even if the video sensor 12 produces 30 frames per second, and the first process is executed once per second, it is not necessary to use all 30 frames as first frames. At least two first frames are necessary for the first process, but more than two are not necessary (though certain embodiments may use more than two).

Similarly, it is not necessary for all of the image frames to be used as second frames, though for certain embodiments it may be advantageous to do so.

Indeed, it is possible that the video sensor 12 and/or the frame grabber 14 may generate image frames that are not used for either the first or the second process. Depending on the particular embodiment, any unused image frames may be discarded, or they might be used for a third or a fourth process, etc.

In a preferred embodiment, the dynamic resolution of the image frames, first frames, and second frames is at least 24 bits.

One exemplary arrangement for producing first and second frames that are identical to image frames is to simply split or duplicate each frame produced by the video sensor 12. This may be accomplished in a variety of ways, for example by using a video sensor 12 with duplicate output feeds, by using a frame grabber 14 adapted to generate duplicate images, or by using a processor 16 that copies the image frames internally for use as both the first and the second frames as part of image processing.

Such an arrangement may be advantageous for certain embodiments, for at least the reason that it is extremely simple. It is not necessary to manipulate the images prior to the first and second processes, and no mechanisms for time stealing or image trimming are required.

Regardless of the precise manner in which the apparatus generates the first and second frames, whether exclusive or non-exclusive, a wide variety of processes may be performed as the first and second processes.

Suitable first processes include, but are not limited to, flame detection.

Suitable second processes include, but are not limited to, detecting smoke, displaying a human-viewable output, performing traffic observation, performing security monitoring, and performing other hazard and incident detection processes.

It is noted that an apparatus 10 in accordance with the principles of the claimed invention is not limited to only specific algorithms for performing the first and second processes. The possible number of suitable algorithms is extremely large, and depends to a substantial degree upon the nature of the particular first and second processes, i.e., suitable algorithms for flame detection may be very different from suitable algorithms for traffic observation.

For illustrative purposes, an algorithm for flame detection is described below. It is emphasized that it is exemplary only, and that other algorithms for flame detection, as well as other algorithms for other first or second processes, may be equally suitable.

However, before describing the algorithm in detail, it may be helpful to provide remarks regarding color and the processing of color in images. The following discussion explanatory only; it should not be interpreted as an indication that the claimed invention requires color imaging. Embodiments of the claimed invention that do not use color may be equally suitable.

As previously noted, in a preferred embodiment, the fire detection apparatus 10 operates using color. Color may be defined according to a variety of systems.

Figure 2:
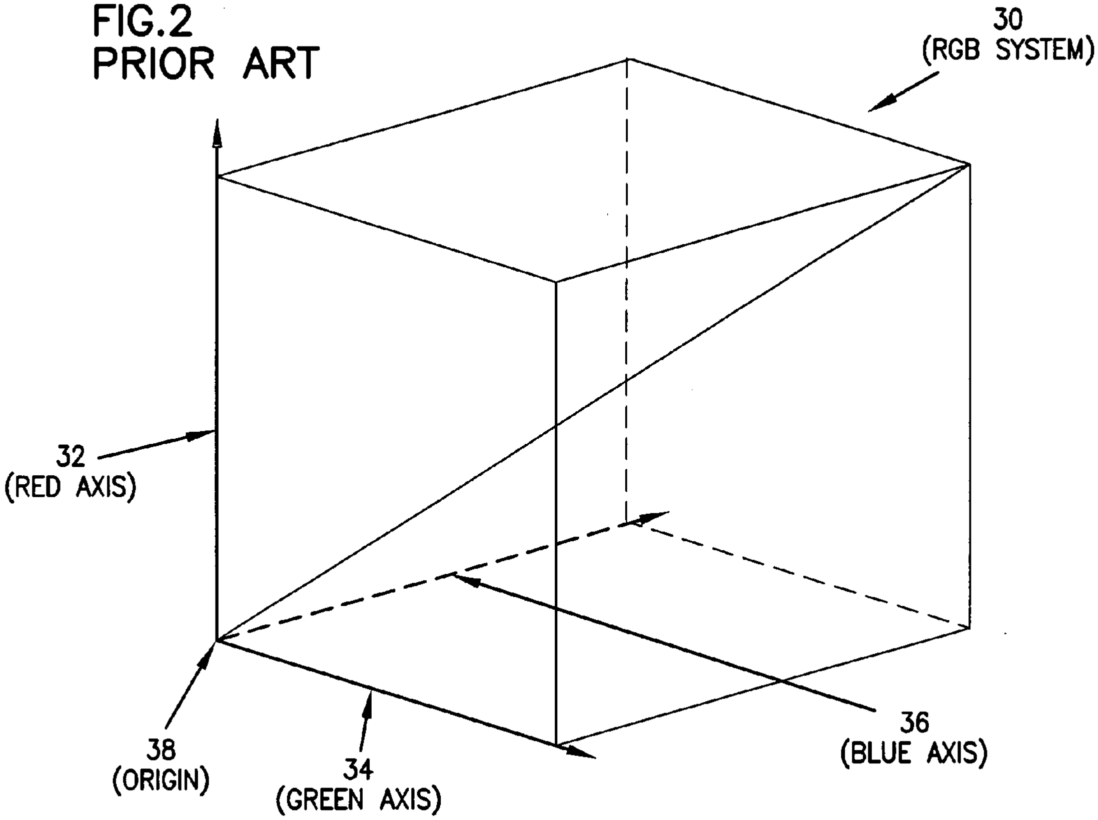
FIG.2 PRIOR ART
FIG. 2 is a representation of an RGB system of color identification.

For example, a representative illustration of an RGB system 30 is shown in FIG. 2. The RGB system may be conceptualized as a three-dimensional Cartesian coordinate system, having a red axis 32, a green axis 34, and a blue axis 36, connecting at an origin 38. Colors are identified in terms of their red, green, and blue components. The RGB system is advantageous for certain applications, in that many color video sensors are constructed using three separate sets of sensors, i.e. one red, one green, and one blue, and are therefore naturally adapted to generate images in RGB format.

Figure 3:
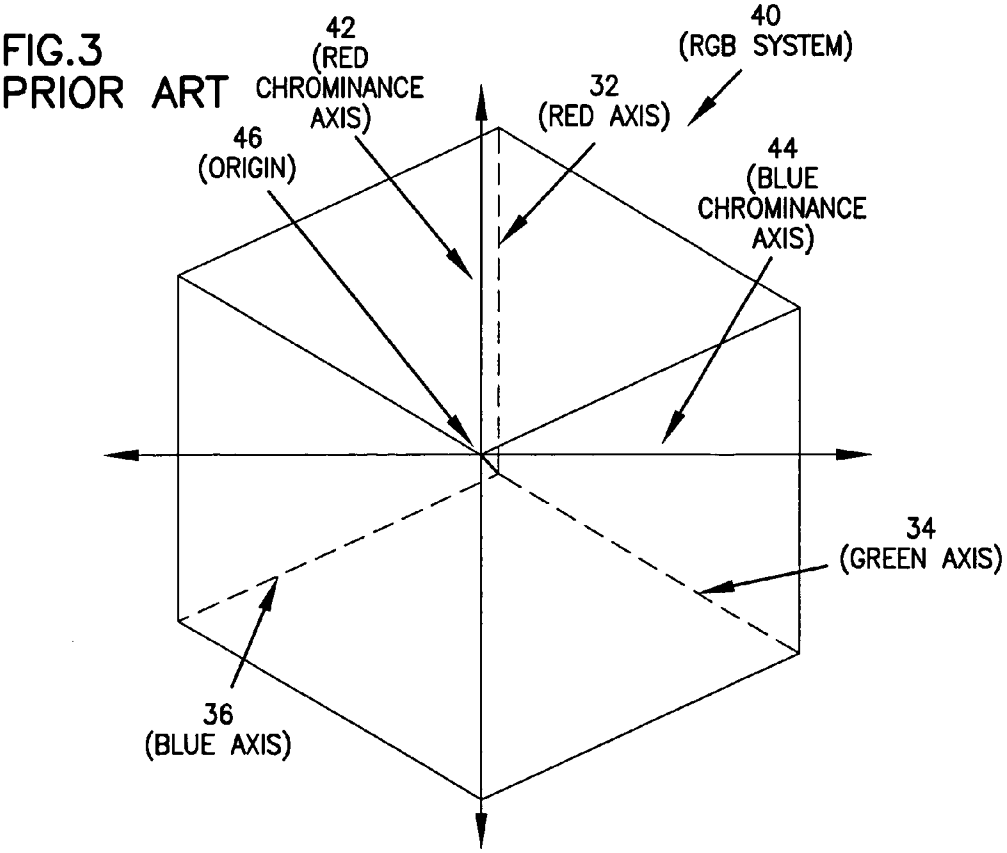
FIG.3 PRIOR ART
FIG. 3 is a representation of a YCrCb system of color identification superimposed over a representation of an RGB system of color identification.

One alternative to the RGB system is a YCrCb system 40, as shown in FIG. 3. The YCrCb system may be conceptualized as a conical coordinate system having a red chrominance axis 42 and a blue chrominance axis 44 connecting at an origin 46. Hues are defined in terms of their red and blue chrominance. Hues located at the origin 46 are neutral hues, i.e. black, gray, and white. It will be appreciated by those knowledgeable in the art that in the YCrCb system, a hue may be defined either by Cr and Cb coordinates or by an angle value. In addition, the brightness or luminance of a color in the YCrCb system is identified as Y, the length of a line running from the origin 46 to the Cr and Cb values of the color. The YCrCb system is advantageous for certain applications, in that brightness and hue may be separated easily and meaningfully from one another. For this reason, many devices for image processing use a YCrCb system.

As may be seen from FIG. 3, the YCrCb system 40 may be overlaid upon the RGB system 30. Thus, YCrCb values may be derived from RGB values. For example, Y is equal to the square root of the sum of the squares of R, G, and B, that is $Y=\sqrt{R^2+G^2+B^2}$. It will be appreciated that such a conversion is not loss-less, however, it is mathematically convenient for certain applications.

In a preferred embodiment of an apparatus in accordance with the claimed invention, the video sensor 12 generates images in an RGB system, while the processing device 16 converts RGB inputs into a YCrCb system and performs analysis on images in the YCrCb system. However, it will be appreciated that this arrangement is exemplary only, and that a variety of alternative color definition systems may be equally suitable for both the video sensor 12 and the processing device 16.

Figure 4:
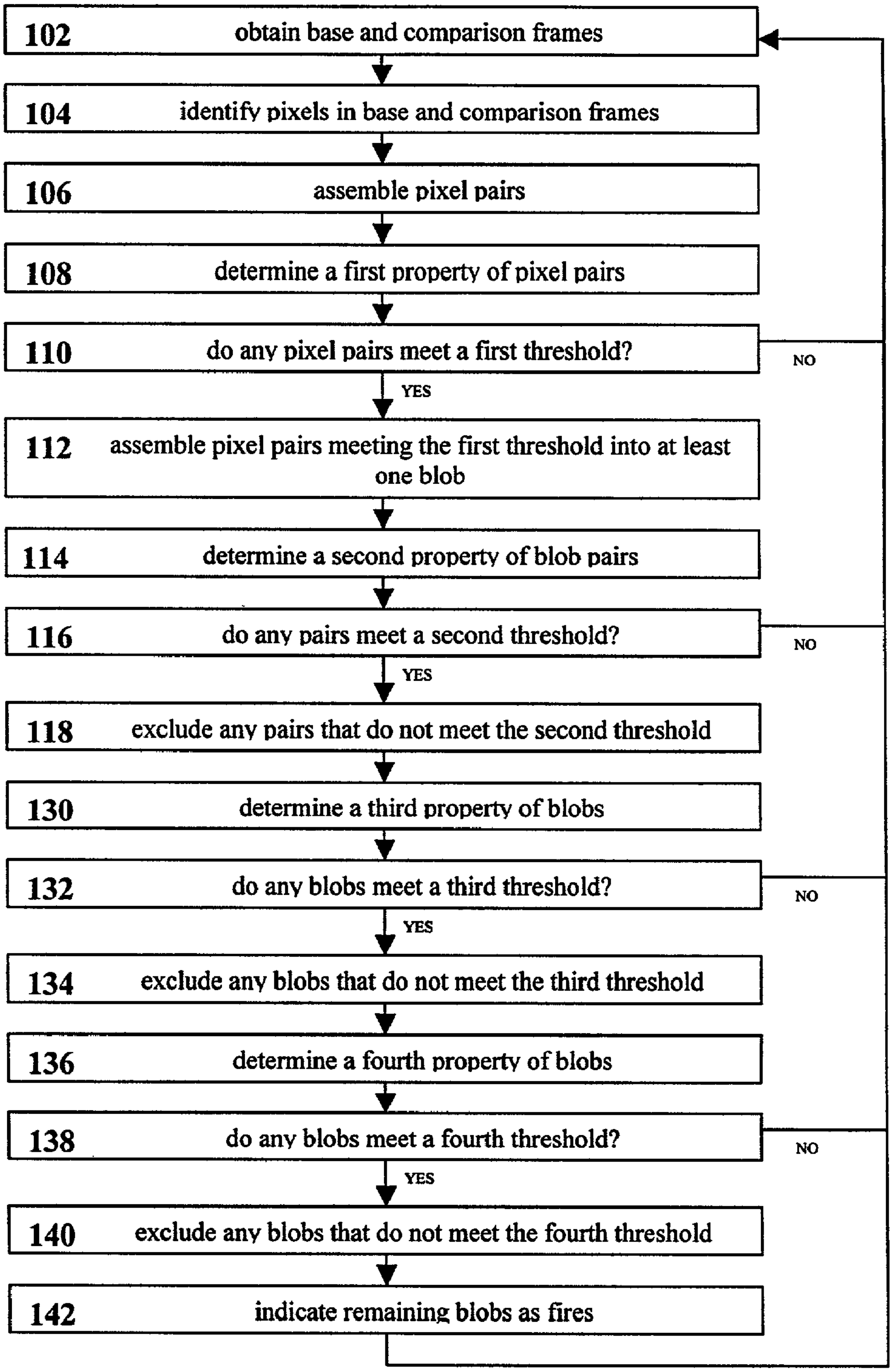
FIG. 4 is a flowchart showing a method in accordance with the principles of the claimed invention.

Returning to above-mentioned algorithm for detecting the presence of fire, FIG. 4 shows an exemplary algorithm in a general form.

A method of detecting fires 100 in accordance with the principles of the claimed invention includes the step of collecting 102 first frames. For purposes of discussion in this example, it is assumed that there are exactly two first frames, identified as the base and comparison frames. The base and comparison frames are obtained with a period of elapsed time between them. The time period is of a duration such that in a real fire, significant and measurable changes would occur in the fire. In an exemplary embodiment of a method in accordance with the principles of the claimed invention, the time period is on the order of 1/30 of a second. This time period is sufficient to enable analysis of changes in geometry and color, and is convenient in that a variety of conventional video sensors are adapted to obtain images spaced 1/30th of a second apart. However, this time period is exemplary only, and other time periods may be equally suitable.

In addition, it will be appreciated that it may be advantageous to enable the time period to be adjusted according to user preferences and/or local conditions.

Individual pixels are defined and identified 104 in the base and comparison frames.

The base and comparison frames each consist of a plurality of pixels. The pixels of the base and comparison frames correspond spatially, such that for each base frame pixel there is a spatially corresponding comparison frame pixel. These spatially corresponding pixels from the base and comparison frames are assembled 106 into a plurality of pixel pairs, wherein a base frame pixel and its spatially corresponding comparison frame pixel constitute a pair. The base and comparison frames therefore constitute a plurality of pairs.

In the exemplary method disclosed herein, pixels and hence pairs are assumed to be defined as the frames are obtained. This is convenient, in that many video sensors produce video images in the form of an array of pixels, and in that frames made up of pixels are readily transmitted and manipulated. However, this arrangement is exemplary only, and pixels in a frame may be defined at any point between the time when the images are obtained 102 and when the pairs are first evaluated at step 108.

A method in accordance with the principles of the claimed invention also includes the step of determining 108 a first property of at least some of the pixel pairs. The range of properties is quite broad, and may include essentially any measurable quality of an image, including but not limited to intensity, color, and spatial or temporal variations in intensity and color.

Properties that are based on variations may be measured in terms of the difference between base pixels and comparison pixels, or between pairs, or between groups of pairs (i.e., blobs, as described below).

In addition, properties of blobs (see below) may also be evaluated, including but not limited to overall color, overall intensity, shape, area, perimeter, edge shape, edge sharpness, and geometric distribution (i.e. location of a blob's centroid and/or edges).

A more concrete example of an algorithm is described later, providing more detail in this matter. However, the precise nature of the first property, or the other properties described in this example, is not limiting to the invention.

It is noted that not all pixel pairs need be evaluated, either in step 108 or in the other steps described in this example. For certain embodiments it may be advantageous to evaluate all pixels, however, for certain other embodiments it may be advantageous to exclude, or at least be able to exclude, a portion of the pixels. For example, if a known and accepted fire is located within the field of view of the video sensor 12, it may be advantageous to exclude the portion of the base and comparison frames that represents that fire, so as to avoid false alarms from a known source.

At least a portion of the individual pairs of pixels are compared 110 to a first threshold.

As with the first property, the first threshold may vary considerably, although it must of course relate to the first property. For example, the first threshold may be a minimum intensity of each pixel in a pair, a minimum average value for a pair, etc. Again, the precise nature of the first threshold, or the other thresholds described in this example, is not limiting to the invention.

If no pixel pairs meet the first threshold, the process 100 is over. No flame is determined to be present. However, since flame detection is typically an ongoing process, rather than a discrete event, the process 100 typically repeats, as shown in FIG. 4.

Any pixel pairs that meet the first threshold 110 are considered to be blob pairs, and are assembled 112 into one or more blobs. A blob is an assembly of blob pairs that is identified for further study.

Depending on the precise embodiment, a blob may be defined in various ways. In its simplest form, it is a collection of contiguous pixel pairs. A further exemplary description of the formation of a blob is provided later, however, the precise manner in which a blob is assembled is not limiting to the invention.

It is possible for there to be more than one blob at a time. If there are multiple blobs, all of them may be evaluated collectively, or different blobs may be evaluated separately.

Once blobs are assembled 112, at least some of the pixel pairs therein, which may also be referred to as "blob pairs", are evaluated to determine 114 a second property.

If no pairs meet 116 a second threshold, the process 100 is over. However, if some pairs do meet 116 the second threshold, any pairs that do not are excluded 118 from the blob.

It is noted that, up to this point in the exemplary algorithm, individual pairs have been the focus of the evaluations. That is, the properties of individual pairs have been evaluated, and individual pairs have been excluded if they do not meet the thresholds. However, this is exemplary only. As is shown in the next steps described, it may also be suitable to evaluate entire blobs, and/or to exclude entire blobs, etc. Furthermore, it may be suitable to address individual pairs at certain points of the algorithm, and complete blobs at other points.

Next, the blobs are evaluated to determine 130 a third property. If no blobs meet 132 a third threshold, the process 100 is over. If one or more blobs do meet 132 the third threshold, any blobs that do not are excluded 134 as non-fires.

This process may continue almost indefinitely, with determination of a fourth property 136, etc. In each case, it is determined whether the blob (or, alternatively, the blob pairs) meet a fourth threshold 138, etc. If no blobs (or pixels) meet the relevant threshold, the process ends. Blobs (or pixels) that do not meet the relevant threshold are excluded, as shown in step 140.

The number of steps to in the algorithm may vary considerably. There is a general (though not absolute) relationship that, the more steps the algorithm includes, the more discriminating it is, i.e. the better it is at detecting fires and rejecting false alarms. Conversely, the more steps the algorithm includes, the more processing power is necessary, and the more time is required to detect a fire. In a given embodiment, the number of steps and the precise analyses performed therein will vary based at least in part on this trade-off.

In addition, an algorithm for flame detection may be tailored to a variety of circumstances, including but not limited to local lighting conditions, the fuel type of the anticipated fire, local optical conditions (i.e. the presence of dust, sea spray, etc.), and whether known false alarm sources will or will not be present.

However, at some point, the analysis is complete. Once analysis is completed, if any blobs remain, they are indicated 142 as a flame.

In order to illustrate additional detail, a more concrete example of an algorithm for flame detection is now provided.

Figure 5:
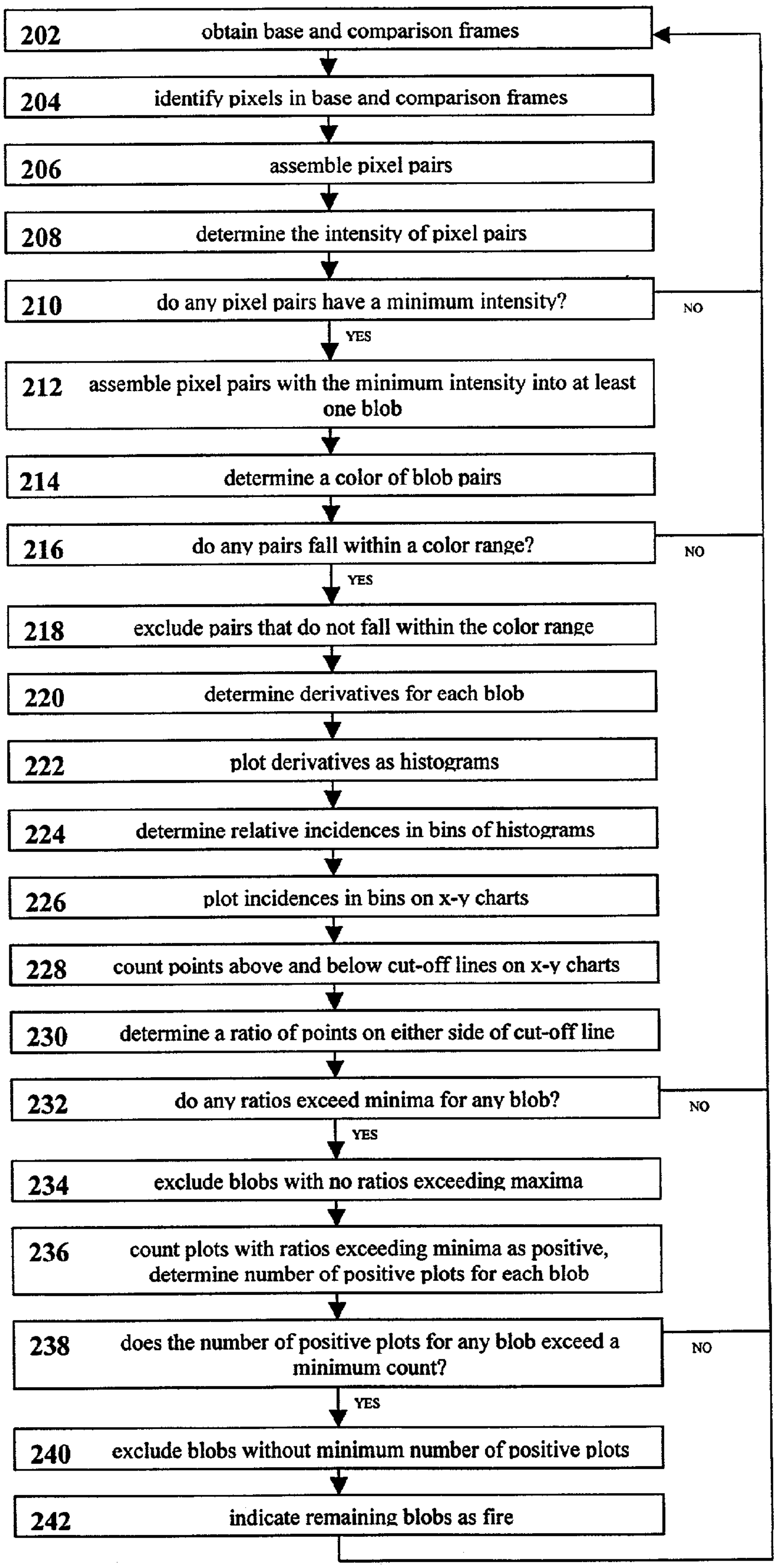
FIG. 5 is a flowchart showing another method in accordance with the principles of the claimed invention.

Referring to FIG. 5, a method of detecting fires 200 in accordance with the principles of the claimed invention includes the step of collecting 202 first frames. As in the previous example, it is assumed for purposes of discussion that there are exactly two first frames, identified as the base and comparison frames.

Individual pixels are defined and identified 204 in the base and comparison frames.

The base and comparison frames each consist of a plurality of pixels, and are assembled 206 into a plurality of pairs.

A method in accordance with the principles of the claimed invention also includes the step of determining 208 the intensity of at least some of the pixel pairs. Intensity is the overall brightness of an image. This value is useful in identifying flames for at least the reason that flames are generally more intense than non-flame objects. (A pixel is considered to be overfilled if is completely filled by an image artifact larger than the pixel itself In other words, the image artifact is too large for the pixel to contain, thus the pixel is overfilled.) Furthermore, although the intensity of a pixel overfilled by a flame varies based on the particulars of apparatus and settings, pixels overfilled by flames tend to have a similar intensity for all flames, at all distances, for a particular apparatus and particular image settings.

Any pixel pairs that are determined 210 to have a minimum intensity are considered to be blob pairs, and are assembled 212 into one or more blobs.

If no pixel pairs meet the minimum intensity, the process 200 is over. No flame is determined to be present. However, since flame detection is typically an ongoing process, rather than a discrete event, the process 200 typically repeats, as shown in FIG. 5.

In an exemplary embodiment, the determination 210 of intensity is made with respect to both pixels in a pair, that is, both pixels must meet some minimum intensity threshold. However, this is exemplary only. It may be equally suitable to determine 210 intensity in other ways, including but not limited to measuring the intensity value of only one pixel, or the average intensity of a pair.

Pixel pairs that meet the minimum intensity are assembled 212 into blobs. It is emphasized that blobs are analytical constructs, with no objective physical reality; they do not necessarily represent fires, or any other object. They are a convenience for processing purposes. Furthermore, it is noted that although it may be convenient to envision and/or process blobs as visual artifacts, this is exemplary only. Blobs may also be treated as strictly logical or mathematical constructs. Thus, nearly any arrangement for assembling blobs 212 may be suitable.

In an exemplary embodiment, a blob may be assembled if it meets the following conditions. It must have at least 5 contiguous qualified pixel pairs in one row. It must have at least one qualified pixel in a row above or below, contiguous with the row of 5 contiguous pairs. And, it must have at least 25 qualified pixel pairs total. However, it is emphasized that this is exemplary only, and that other defining approaches for assembling blobs may be equally suitable.

It is noted that further processing may reduce the number of qualified pixel pairs present. This may reduce the total number of pixel pairs that make up a blob, and may even alter the blob to the point that it no longer meets the definition criteria for a blob. For example, if some pixel pairs are excluded from a particular blob, it might no longer have 25 or more qualified pixel pairs.

Depending on the embodiment, it may be advantageous to exclude a blob if at any time it no longer meets the defining criteria for a blob. Alternatively it may be advantageous to treat all blobs as blobs once defined, regardless of the number and arrangement of pixel pairs therein. As an intermediate option, it may be advantageous to assign one or more intermediate definitions that a blob must meet at each step of processing. For example, after color determination 214 (see below), the total number of qualified blob pairs in each blob must be 20, where before it was 25. As previously stated, blobs are calculating conveniences. Nearly any arrangement for defining and redefining them may be suitable.

Once one or more blobs are assembled 212, in whatever fashion, at least some of the pixel pairs therein, which may also be referred to as "blob pairs", are evaluated to determine 214 their color.

In a preferred embodiment of a method in accordance with the principles of the claimed invention, color information for the pixels is evaluated in terms of a YCrCb system. In this preferred embodiment, color information is processed using 8-bits each for Y, Cr, and Cb, such that each of Y, Cr, and Cb have values ranging from 0 to 255. In addition, the Cr and Cb values are set such that their origin is 128. Although for many coordinate systems it is traditional to set the origin equal to (0,0), this is not required. It will be appreciated by those knowledgeable in the art that the ranges of Cr and Cb must include portions that have values less than that of the origin. Since standard 8-bit numbering does not include negative values, it is convenient to choose a value for the origin that is approximately midway through the available range, in this case, (128,128). Further discussions herein regarding this exemplary embodiment of a method in accordance with the principles of the claimed invention will refer to this exemplary coordinate system. However, it will be appreciated by those knowledgeable in the art that this arrangement is exemplary only, and that other numerical systems and other systems of handling color may be equally suitable.

In a preferred embodiment, the acceptable color range is represented by the requirement that:

$$|Y_0-Y_1|>5 \text{ AND } |Cr_0-Cr_1|>5 \text{ AND } (Cr_0 \text{ OR } Cr_1)>128$$

wherein $Y_0$ is the base luminance for the pair under consideration;

$Y_1$ is the comparison luminance for the pair under consideration;

$Cr_0$ is the base red chrominance for the pair under consideration; and $Cr_1$ is the comparison red chrominance for the pair under consideration.

As written above, the first threshold is that the difference in luminance between the base and the comparison pixel is at least 5, the difference in red chrominance is at least 5, and the maximum red chrominance of the base and comparison pixels is at least 128. That is, the pixel pairs must indicate a change in luminance, a change in red chrominance, and a strong red chrominance overall. These exemplary values are characteristic of certain common types of fire, including but not limited to those fueled by hydrocarbons, and therefore are convenient as a first threshold. However, it will be appreciated by those knowledgeable in the art that these values are exemplary only, and that other values may be equally suitable for the first threshold. For example, since air-entrained, premixed methane flames commonly include a strong blue component (as may be seen in the bluish color of common gas stove flames, for example), an acceptable color range that defines values for Cb might be suitable for embodiments adapted to detect such flames.

In addition, it is noted that the color range may be more complex than that illustrated above. In particular, the color range may include two or more unconnected sub-ranges, i.e. for simultaneous sensitivity to two or more different type of fires, with two or more different colors.

In addition, it will be appreciated that it may be advantageous to enable the color requirements to be adjusted according to user preferences and/or local conditions.

In an exemplary embodiment of a method in accordance with the principles of the claimed invention, color evaluations 214 may also include determining a plurality of chrominance angles for the blob pairs. In the exemplary case wherein color is processed in terms of YCrCb values, this is a matter of calculating the ratio Cr/Cb and calculating the arctangent thereof. This represents a ratio of redness to blueness. YCrCb coordinates are particularly advantageous for such calculations, since if the luminance coordinate Y is omitted, the resulting two-dimensional plot indicates hue only, without intensity data. However, it will be appreciated that data similar to a YCrCb chrominance angle may be determined for other color systems as well.

In an exemplary embodiment of a method in accordance with the principles of the claimed invention, the determination 216 of whether pixel pairs fall within the color range also includes determining whether their chrominance angles fall within an angular window. Chrominance angles of actual fires typically fall within a relatively narrow window; chrominance angles that are outside of the window may be excluded from consideration. This is advantageous, for at least the reason that it provides a simple and effective way of excluding many types of false alarms based on their hue.

For example, although artificial lighting, daytime skies, and direct sunlight may all have relative high light intensities, they do not have chrominance angles that match those of fires. Sunlight and artificial lighting are typically balanced or nearly balanced with regard to red chrominance and blue chrominance. Daytime skies normally have stronger blue chrominance than red chrominance. However, as noted above, actual fires have a relatively strong red chrominance overall.

In a preferred embodiment, the window range indicative of an actual fire is from 115 to 135 degrees, relative to the positive Cb axis. However, it will be appreciated by those knowledgeable in the art that other ranges may be equally suitable. For example, the fuel being burned influences the chrominance angles of a fire. As a particular exemplary case, propane and butane fires tend to have lower angles than diesel fires, and therefore if diesel fires are to be preferentially detected, it may be advantageous to increase the upper range limit of the angle window, and/or increase the lower range limit of the angle window.

Use of a chrominance angle window is advantageous for certain applications, in that it excludes clearly irrelevant data, thereby avoiding unnecessary of processing and improving the relevance of the data that is processed. However, it will be appreciated by those knowledgeable in the art that it is exemplary only, and that omitting the use of a chrominance angle window may be equally suitable for certain applications.

Regardless of the particulars of the color range, blob pairs are evaluated 216 to determine whether they fall within this color range. If no blob pairs fall within the color range, the process 200 is over. As previously noted, the process 200 typically repeats, as shown in FIG. 5.

Pairs that do not fall within the color range are excluded 218.

For each blob, at least one derivative is determined 220.

As is well-known in the art, a derivative is a value representing the rate of change of one property with respect to another. Derivatives may be determined 220 for a variety of properties, examples of which are disclosed below.

The derivatives may include derivatives with respect to distance, or with respect to time, or both. Derivatives with respect to distance provide information about variations in a blob across distance (also referred to as "spatial anisotropies"), while derivatives with respect to time provide information about variations in a blob over time (also referred to as "temporal anisotropies").

In the exemplary arrangement described herein, a derivative with respect to distance requires comparison of at least two blob pairs, or individual pixels thereof, since the base and comparison pixels making up any individual pixel pair (and hence a blob pair) represent the same point in space.

Also, in the exemplary arrangement described herein, a derivative with respect to time requires comparison of a base pixel to a comparison pixel, since the base and comparison pixels represent different times. Typically the base and comparison pixels making up a blob pair will be used, as they each represent the same point in space.

Thus, in this exemplary embodiment, distance derivatives are made between blob pairs, and time derivatives are made within blob pairs.

However, these arrangements are exemplary only. Other imaging and processing arrangements may be equally suitable, and may incorporate other ways of determining derivatives with regard to distance and time.

Suitable derivatives for flame detection include, but are not limited to, $$\frac{dY}{dt}, \frac{dY}{dx}, \frac{dC_R}{dt}, \frac{dC_R}{dx}, \frac{dC_B}{dt}, \text{ and } \frac{dC_B}{dx}.$$

It is emphasized that these derivatives, and flame detection itself, are exemplary only. Other derivatives may be equally suitable for flame detection, and other processes may use other derivatives.

$$\frac{dY}{dt}$$

is a derivative of intensity, represented in YCrCb coordinates by Y, with respect to time. It indicates the change in intensity of a blob, and/or of portions thereof, as time passes. Flames are known to change in intensity over time, while many non-flame sources, i.e. electric lights, sunlight, etc., do not. Thus, evaluation of this derivative may distinguish between flame and non-flame sources.

$$\frac{dY}{dx}$$

is a derivative of intensity with respect to position. It indicates variations in intensity across the blob. Flames are known to have variations in intensity across their structure at any given time, while many non-flame sources do not. Thus, evaluation of this derivative may distinguish between flame and non-flame sources.

Although x is sometimes used to indicate a particular direction, i.e. a Cartesian coordinate axis, it is used herein in its more general meaning of spatial position. That is, dx may represent a change in position along an x axis, but it might also represent a change in position along a y or a z axis, or along some non-Cartesian axis. It may also represent a directionless quantity such as distance, rather than a displacement along any particular axis.

$$\frac{dC_R}{dt} \text{ and } \frac{dC_B}{dt}$$

are derivatives of red and blue chrominance respectively with respect to time. They indicate the change in color of a blob and/or portions thereof over time.

$$\frac{dC_R}{dx} \text{ and } \frac{dC_B}{dx}$$

are derivatives of red and blue chrominance with respect to position. They represent variations in color across the blob. As with $$\frac{dY}{dx},$$

it is noted that x represents a general position, not a particular axis.

The combination of the above exemplary derivatives provides a thorough description of how the intensity and color of a blob varies in time and space. Although many non-fire objects vary in time and space, including some that superficially resemble flames, the variations exhibited by flames are not ordinarily found in non-flame sources.

For example, although some fixed lights may emit light with intensity and color generally similar to that of a flame, they do not vary in time or space, and thus can be identified as non-flames on that basis.

Also, moving lights, such as those attached to vehicles, move from place to place, and hence may be considered to vary, but they do not generally vary in the same manner as a flame. For example, small portions of a flame often vary in intensity and color both with respect to time and space, while artificial lights generally do not exhibit such features.

Reflections from rippling material such as water may vary with regard to intensity, but not color. They are distinguishable from flame by the claimed invention on that basis.

Thus, the thorough description of temporal and spatial anisotropies renders the exemplary flame detection process described herein resistant to false alarms. It is noted that the above identified false alarm sources are exemplary only; other false alarm sources may exist, and may be distinguishable by the claimed invention.

However, it is again emphasized that the flame detection process is exemplary only. Other flame detection processes, and other processes not related to flame detection, may be equally suitable while still adhering to the principles of the claimed invention.

The step of determining derivatives 220 may be performed in any suitable manner. Methods of determining derivatives are various and well known, and are not described herein.

At least some of the values of the derivatives are plotted as histograms 222.

As is well known, histograms have multiple accumulation bands, referred to herein as bins. For example, a histogram of values ranging from 0 to 1 might include bins for 0 to 0.2, 0.2 to 0.4, 0.4 to 0.6, 0.6 to 0.8, and 0.8 to 1. The histogram indicates the number of values that fall into each bin.

In the exemplary embodiment of a flame detection process described herein, the precise number and boundaries of the bins may vary substantially depending upon the precise embodiment, both from one histogram to another within a single embodiment and from embodiment to embodiment.

Regardless of the number of bins, the incidence of the bins is determined 224. In a preferred embodiment, the histograms are normalized, that is, the counts in all bins of each histogram are multiplied by some factor such that the sum of the incidences of all bins in each histogram is equal to a fixed value, such as 1. For certain embodiments, this may simplify further processing, and it is assumed for purposes of discussion herein that the histograms are normalized. However, it is exemplary only.

Once the incidences are determined 224, at least some of the incidence values are plotted 226 against one another on at least one x-y chart. This is accomplished by considering an incidence value of one bin as an x value, and an incidence value of another bin as a y value, and plotting the resulting position.

Bins whose values are plotted against one another may be from the same histogram, or may be from a different histogram. In a preferred embodiment, each of the bins from a first histogram is plotted against each of the bins of a second histogram. For example, each bin of a $$\frac{dY}{dx}$$

histogram may be plotted against each bin of a $$\frac{dC_R}{dt}$$

histogram. However, this is exemplary only.

By analysis of data from actual flames, it has been determined that derivatives of certain image properties, including but not limited to $$\frac{dY}{dt}, \frac{dY}{dx}, \frac{dC_R}{dt}, \frac{dC_R}{dx}, \frac{dC_B}{dt}, \text{ and } \frac{dC_B}{dx},$$

of actual flame images tend to be different from those obtained from non-flame images. More particularly, when derivatives of image properties of flame images are plotted against one another, the resulting points tend to occur in different parts of the plot than points similarly generated from non-flame images.

For example, in a particular plot, points from a flame image might cluster in the upper right, while points from a superficially similar non-flame image cluster in the lower left.

This is a result of the differences in color, color variation, intensity, intensity variation, etc. between an actual flame and another phenomenon that may in some ways resemble a flame. The optical properties of flames are sufficiently distinct that images of flames may be distinguished from images of non-flames on this basis.

The precise data distributions for flames as opposed to non-flames are complex, and are beyond the scope of this application. They are obtained empirically, by accumulating data from flame and non-flame phenomena. It is noted that the data distributions may vary substantially depending upon the properties of the flame (i.e. fuel type), local conditions (i.e. presence of smoke, vapor, etc.), and the particulars of the embodiment (i.e. hardware sensitivity to particular color ranges). In addition, the precise position of the cut-off line is to some degree a matter of design choice, based upon the data accumulated.

However, by routine data accumulation and analysis, it is possible to define a cut-off line on at least some of the x-y charts that are formed at step 226, and to count 228 points that are above and below the cut-off line. Points indicative of an actual fire will tend to fall on one side of the cut-off line; points indicative of non-fires will tend to fall on the opposite side of the cut-off line.

Depending on the layout of the x-y plot, the cut-off line may be vertical, horizontal, or angled. Although the term "line" sometimes is used to imply a perfectly straight geometry, it is not necessary for the cut-off line to be straight. For some embodiments, it may be convenient for the cut-off line to be straight, however, for other embodiments it may be more suitable for the cut-off line to be curved. The precise structure of the line is incidental, so long as it demarcates an area or areas within the x-y chart such that points plotted therein are indicative of fire.

It is noted that, because fire is highly variable and the number of possible non-flame sources is extremely large, the cut-off line will not necessarily be a perfect discriminator. Occasional points from an actual flame image may fall on the non-fire side of the cut-off line, and occasional points from non-flame images may fall on the fire side. However, in aggregate, flame points will fall on the flame side, and non-flame points will fall on the non-flame side.

Once points are plotted 226 and counted 228, a ratio of points falling on the fire side of the line and the non-fire side of the line is determined 230 for each x-y plot.

The ratio for each x-y plot is compared 232 to a minimum value for that plot. The minimum value for different plots is determined empirically, and may be different for each plot.

Plots that exceed their minima are considered to be positive, i.e. representative of an actual fire. Plots that do not exceed their minima are considered negative, i.e., not representative of a fire.

If, for any given blob, no plots are positive (i.e. exceed their respective minima), the blob is excluded 234. If no plots for any blob are positive, the process 200 is over. No flame is determined to be present. As previously noted, the process 200 typically repeats, as shown in FIG. 5.

For any blob that has at least one positive plot (i.e. at least one x-y plot ratio exceeds its minimum), the total number of positive plots is counted 236 for each remaining blob.

The number of positive plots for each remaining blob is compared 238 to a minimum count. The minimum count is a minimum number of plots which must be positive in order for a blob to be considered representative of an actual flame. The minimum count is determined empirically, based upon actual flame data.

Any blobs that do not have enough positive plots to meet the minimum count are excluded 240 as non-flames.

Any blobs that have enough positive plots to meet the minimum count are considered to be flames, and are indicated 242 as such.

The indication step 242 may include a variety of actions. For example, audible and/or visual alarms may be triggered, fire suppression systems may be activated, etc. Indication of a fire 242 may include essentially any activity that might reasonably be taken in response to a fire, since at this point a fire is considered to be actually present.

It is noted that the multiple redundancy of the process as described herein is robust in terms of error trapping. A few unusual pixel pairs, or a few unusual derivatives, or a few unusual histogram incidences, or even a few unusual x-y plots, will not greatly skew the data overall. However, such an arrangement is exemplary only, and other arrangements, including those with less redundancy, may be equally suitable.

It is also noted that the certain of the parameters described in the exemplary embodiment may be variable in real time, i.e. while the embodiment is functioning. In particular, it may be advantageous for certain embodiments to include the capability to vary parameters in order to accommodate changing circumstances.

For example, the size of blobs that are detected may vary, some being larger than others, and hence having more blob pairs. Many of the analysis steps above, as well as others that may be suitable, may execute differently depending on the amount of data. Histograms (such as those of the derivatives described above), for example, tend to have a higher deviation, i.e. a greater variation from their "normal" shape, when the amount of data therein is small than when the amount of data is large.

Thus, it may be advantageous to broaden at least some of the analytical parameters when the amount of data for a given blob is relatively small, and/or to tighten them when the amount of data is relatively large. For example, the positions of the cut-off lines used in step 228 might be adjusted, or the minima for the ratios used in step 230 might be changed, to accommodate greater variability due to limited data.

However, such accommodations are exemplary only.

In addition, it is once more emphasized that the preceding detailed process for flame detection is exemplary only. A variety of alterative or additional steps may be equally suitable, including but not limited to those described below.

The coloration of blobs may be evaluated to determine a distribution of chrominance angles for the pixels making up the blobs. For example, in an embodiment using For example, in an embodiment using YCrCb color coordinates, wherein the color may be expressed as a simple angular value, the chrominance angle values for the blob may be sorted by magnitude. The chrominance angle values of each of the base and comparison pixels may sorted by magnitude into bins consecutively. The chrominance angle values thus could be made to form a histogram. This is a convenient arrangement for further analysis.

The color and/or intensity distribution may be compared to reference patterns. The steps of plotting incidences 226 and determining ratios 230 is one such comparison, however, it may be advantageous for certain embodiments to use alternative comparisons, including but not limited to direct "shape" comparisons to known false alarm sources Known chrominance angle patterns representative of both actual flames and of false alarm sources would serve as references for comparison purposes. The reference chrominance angle distributions might include a sunlight distribution, an incandescent distribution, a flame distribution, a reflection distribution, etc. In such a case, positive correlation with a fire distribution is indicative of an actual fire; a positive correlation with a false alarm distribution is indicative of a false alarm.

In addition, blobs may be evaluated in terms of properties other than those described above. For example, they might be studied in terms of their particular geometry, since flames have shapes, proportions, etc. that are often very different from other superficially similar phenomena.

Blob geometry studies may the step of determining an area of a blob. This could be accomplished by counting the number of blob pairs that correspond to the blob in question. The area of the blob then could be compared to an area threshold to see whether the area of the blob is indicative of an actual fire.

Similarly, blob geometry studies may include the step of determining a perimeter of a blob. This may be accomplished by counting the number of blob pairs that correspond to an edge of the blob in question. A variety of algorithms may be used to determine whether a particular blob pair corresponds to an edge. For example, it for certain applications it may be advantageous to consider blob pairs to correspond to an edge if they are adjacent to at least on pixel pair that is not a blob pair. However, it will be appreciated to those knowledgeable in the art that this is exemplary only, and that other algorithms may be equally suitable. Regardless of the precise method of determining the perimeter, the perimeter of the blob then could be compared to a perimeter threshold to see whether the perimeter of the blob is indicative of an actual fire.

Ratios of area to perimeter might also be determined.

Blob geometry studies might also include the step of determining a distribution of blob segment lengths for segments of pixels or pixel pairs making up the blobs. That is, the lengths of the segments are sorted by magnitude. For example, the segment lengths of each blob may be sorted by magnitude into bins depending on their length. The length values thus could be used to form a histogram. This is a convenient arrangement for further analysis. However, it will be appreciated by those knowledgeable in the art that this arrangement is exemplary only, and that other arrangements may be equally suitable.

The distribution of segment lengths may be compared to reference distributions. Known blob segment length distributions representative of both actual flames and of false alarm sources could serve as references for comparison purposes. The blob segment length distributions might include a sunlight distribution, an incandescent distribution, a flame distribution, a reflection distribution, etc. A positive correlation with a fire distribution would be indicative of an actual fire; a positive correlation with a false alarm distribution would be indicative of a false alarm.

Blob geometry studies also may include the step of determining the location of the centroid of a blob. This may be accomplished by using weighted averages for each blob pair that makes up the blob in question. The location of the centroid of the blob then may be compared to a centroid threshold to see whether the location of the centroid of the blob is indicative of an actual fire.

It will be appreciated by those knowledgeable in the art that this arrangement of particular geometrical properties and thresholds is exemplary only, and that other arrangements of properties and other comparisons, geometrical and otherwise, may be equally suitable.

In particular, properties and associated thresholds that involve analysis over the course of an interval greater than the time period between a base and comparison image frame and may be suitable. For example, it may be useful for certain applications to retain area, perimeter, or centroid values for comparison with later area, perimeter, or centroid values so as to observe long-term changes therein. Similarly, color and intensity values as well as other suitable values may be observed over time.

It is noted that the invention is described above with reference to only a single imaging iteration. That is, as described above, a single set of at least two first frames and a plurality of second frames is obtained and processed. The invention is so described for purposes of clarity. However, such a “single iteration” embodiment is exemplary only.

In certain embodiments, it may be advantageous to retain more than one set of first and second frames. Multiple sets of frames may be processed sequentially, as each set of frames is generated, and the data therefrom compared. Alternatively, two or more sets of first and second frames may be accumulated and then processed together. In addition, some combination of sequential and group processing may be advantageous.

Likewise, it may be advantageous to retain individual pixels or groups of pixels, or data from the processing of the frames and pixels, over the course of time. Again, this data may be processed sequentially as each set of pixels is generated, Thus, it is possible to accumulate an “image history” of the area that is monitored by the video sensor 12, the better to identify flames and other phenomena therein. Such a feature, though exemplary only, may be advantageous for certain embodiments.

The above specification, examples and data provide a complete description of the manufacture and use of the composition of the invention. Since many embodiments of the invention can be made without departing from the spirit and scope of the invention, the invention resides in the claims hereinafter appended.

We claim:

1. Method of detecting a flame within a field of view of a video sensor, comprising the steps of:

generating a video image with the video sensor, the video image including a sequence of video frames created within a time unit;

the video sensor having adjustable image settings to create frames within the sequence at different image settings;

generating a first set of frames within the sequence at a first image setting selected for imaging a flame, the first set including at least a base frame and a comparison frame; and generating a remainder of the frames within the sequence at a second image setting selected for imaging non-flame objects;

performing a flame detection process using the base and comparison frames, the flame detection process including comparing a location in the base frame with a spatially corresponding location in the comparison frame and identifying differences in the locations as indications of a flame.

2. Method according to claim 1, wherein:

said base and comparison frames comprise consecutive image frames.

3. Method according to claim 1, wherein:

said video image is a color image.

4. Method according to claim 1, wherein:

said remainder of the frames are generated for display as a human-viewable output.

5. Method according to claim 1, wherein said comparing includes:

identifying a plurality of base pixels in said base frame, and a plurality of comparison pixels in said comparison frame, wherein for each base frame pixel there is a spatially corresponding comparison frame pixel, each said base frame pixel and said corresponding comparison frame pixel forming a pair, such that said pluralities of base and comparison image pixels comprise a plurality of pairs.

6. Method of using a video sensor, comprising the steps of:

generating a video image with said video sensor;

obtaining at least two first frames from said video image;

obtaining a plurality of second frames from said video image; and contemporaneously performing a first process using said first frames and a second process using said second frames;

wherein said first process comprises flame detection;

said at least two first frames comprise a base frame and a comparison frame; and said first process comprises the steps of:

identifying a plurality of base pixels in said base frame, and a plurality of comparison pixels in said comparison frame, wherein for each base frame pixel there is a spatially corresponding comparison frame pixel, each said base frame pixel and said corresponding comparison frame pixel forming a pair, such that said pluralities of base and comparison image pixels comprise a plurality of pairs;

determining a first property of at least some of said pairs;

categorizing said pairs as blob pairs if said first property meets a first threshold; and assembling said blob pairs into at least one blob.

7. Method of using a video sensor, comprising the steps of:

generating a video image with said video sensor;

obtaining at least two first frames from said video image;

obtaining a plurality of second frames from said video image; and contemporaneously performing a first process using said first frames and a second process using said second frames;

wherein said first process comprises flame detection;

said at least two first frames comprise a base frame and a comparison frame; and said first process comprises the steps of:

identifying a plurality of base pixels in said base frame, and a plurality of comparison pixels in said comparison frame, wherein for each base frame pixel there is a spatially corresponding comparison frame pixel, each said base frame pixel and said corresponding comparison frame pixel forming a pair, such that said pluralities of base and comparison image pixels comprise a plurality of pairs;

determining a first property of at least some of said pairs;

categorizing said pairs as blob pairs if said first property meets a first threshold;

assembling said blob pairs into at least one blob; and indicating said at least one blob as a fire.

8. Method according to claim 7, wherein:

said first property is intensity, and said first threshold is a minimum intensity threshold.

9. Method according to claim 7, wherein said first process further comprises the steps of:

determining a second property of said blob pairs; and excluding said blob pairs from said blob if said second property of said blob pairs does not meet a second threshold.

10. Method according to claim 9, wherein:

said video image is a color image;

said first and second frames are color frames; and said second property is color, and said second threshold is a color range.

11. Method according to claim 10, wherein:

said color is measured in $YC_RC_B$ coordinates, and said color range is defined in $YC_RC_B$ coordinates.

12. Method according to claim 9, wherein said first process further comprises the steps of:

determining a third property of said blob pairs;

excluding said blob as a non-fire if said third property of said blob pairs does not meet a third threshold.

13. Method according to claim 12, wherein:

determining said third property comprises determining derivatives of differences in intensity and color between said base pixels and said comparison pixels in said blob pairs.

14. Method according to claim 13, wherein:

determining said third property further comprises:

plotting said derivatives as at least one histogram and an incidence in at least two bands in said at least one histogram.

15. Method according to claim 14, wherein:

determining said third property further comprises:

plotting an incidence from at least one of said at least two bands against an incidence of at least another of said at least two bands as at least one x-y plot.

16. Method according to claim 15, wherein:

determining said third property further comprises:

determining a ratio of a number of points on a first side of a cut-off line on said at least one x-y plot to a number of points not on said first side of said cut-off line; and said third property comprises said ratio from said at least one x-y plot.

17. Method according to claim 12, wherein:

said second property is color;

said second threshold is a color range;

said color is measured in $YC_RC_B$ coordinates;

said color range is defined in $YC_RC_B$ coordinates; and said derivatives comprise dY/dt, dY/dx, $dC_R$/dt, $dC_R$/dx, $dC_B$/dt, and $dC_B$/dx, wherein dY/dt is a derivative of intensity with respect to time;

dY/dx is a derivative of intensity with respect to position;

$dC_R$/dt is a derivative of red chrominance with respect to time;

$dC_R$/dx is a derivative of red chrominance with respect to position;

$dC_B$/dt is a derivative of blue chrominance with respect to time;

$dC_B$/dx is a derivative of blue chrominance with respect to position.

18. Method according to claim 12, wherein said first process further comprises the steps of:

determining a fourth property of said blob pairs; and excluding said blob as a non-fire if said fourth property of said blob pairs does not meet a fourth threshold.

19. Method according to claim 18, wherein:

said fourth property comprises a count of a number of instances of meeting said fourth threshold, and said fourth threshold is a minimum count value.

20. Method according to claim 7, wherein said first process further comprises the steps of:

determining a second property of said blob pairs; and excluding said blob as a non-fire if said second property of said blob pairs does not meet a second threshold.

21. Apparatus for performing multiple contemporaneous image processes, comprising:

a video sensor adapted to generate a video image;

a frame grabber in communication with said video sensor, adapted to obtain at least two first frames and a plurality of second frames from said video sensor;

a processor in communication with said frame grabber, adapted to contemporaneously perform a first process using said first frames and a second process using said second frames; and at least one output mechanism in communication with said processor, adapted to generate a first output from said first process, and a second output from said second process;

wherein said processor is adapted to perform flame detection as said first process;

wherein said processor is adapted to perform the following as part of said first process:

determining a first property of at least some of said pairs;

categorizing said pairs as blob pairs if said first property meets a first threshold; and assembling said blob pairs into at least one blob.

22. Apparatus for performing multiple contemporaneous image processes, comprising:

a video sensor adapted to generate a video image;

a frame grabber in communication with said video sensor, adapted to obtain at least two first frames and a plurality of second frames from said video sensor;

a processor in communication with said frame grabber, adapted to contemporaneously perform a first process using said first frames and a second process using said second frames; and at least one output mechanism in communication with said processor, adapted to generate a first output from said first process, and a second output from said second process;

wherein said processor is adapted to perform flame detection as said first process;

said at least two first frames comprise a base frame and a comparison frame; and at least one of said video sensor, said frame grabber, and said processor is adapted to identify a plurality of base pixels in said base frame and a plurality of comparison pixels in said comparison frame as part of said first process, wherein for each base frame pixel there is a spatially corresponding comparison frame pixel, each said base frame pixel and said corresponding comparison frame pixel forming a pair, such that said pluralities of base and comparison image pixels comprise a plurality of pairs;

wherein said processor is adapted to perform the following as part of said first process:

determining a first property of at least some of said pairs;

categorizing said pairs as blob pairs if said first property meets a first threshold;

assembling said blob pairs into at least one blob; and indicating said at least one blob as a fire.

23. Apparatus according to claim 22, wherein said processor is adapted to perform the following as part of said first process:

determining a second property of said blob pairs; and excluding said blob pairs if said second property of said blob pairs does not meet a second threshold.

24. Apparatus according to claim 23, wherein said processor is adapted to perform the following as part of said first process:

determining a third property of said blob pairs;

excluding said blob as a non-fire if said third property of said blob pairs does not meet a third threshold.

25. Apparatus according to claim 24, wherein:

determining said third property comprises calculating derivatives, and said processor is adapted to calculate said derivatives.

26. Apparatus according to claim 25, wherein:

determining said third property further comprises:

plotting said third property as at least one histogram and determining a number of qualified points thereof for at least two bands in said at least one histogram; and plotting an incidence of at least one of said at least two bands against an incidence of at least another of said at least two bands as at least one x-y plot.

27. Apparatus according to claim 24, wherein said processor is adapted to perform the following as part of the first process:

determining a fourth property of said blob pairs; and excluding said blob as a non-fire if said fourth property of said blob pairs does not meet a fourth threshold.

28. Apparatus according to claim 22, wherein said processor is adapted to perform the following as part of said first process:

determining a second property of said blob pairs; and excluding said blob as a non-fire if said second property of said blob pairs does not meet a second threshold.

* * * * *